W. J. WILCOX.
Machine for Stirring Lard.
No. 3,196.
Reissued Nov. 17, 1868.
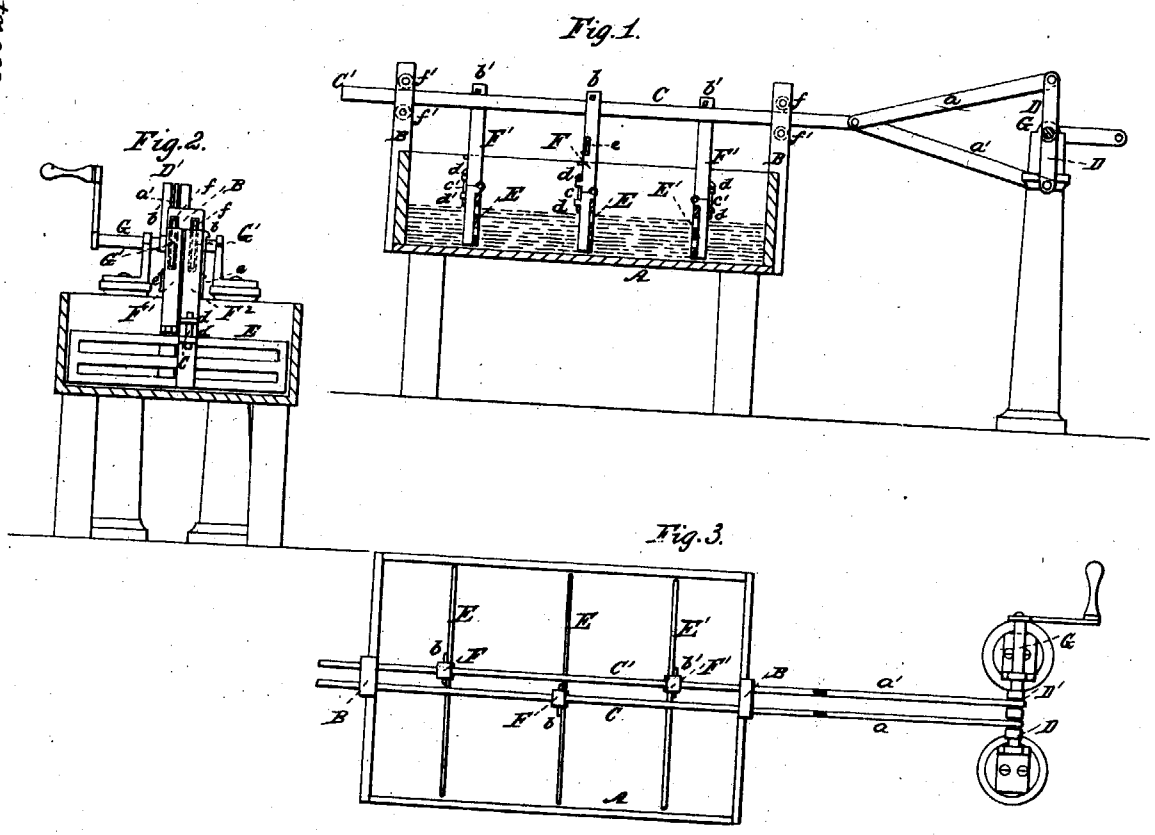
Witnesses:
Seth M. Eldredge
M. Hutchins
Inventor:
William Wilcox
N. PETERS, Photo-Lithographer, Washington, D. C.

United States Patent Office.

WILLIAM J. WILCOX, OF NEW YORK, N. Y.

*Letters Patent No.* 37,469, *dated January* 20, 1863; *reissue No.* 3,196, *dated November* 17, 1868.

IMPROVED MACHINE FOR STIRRING LARD.

The Schedule referred to in these Letters Patent and making part of the same.

*To all whom it may concern:*

Be it known that I, WILLIAM J. WILCOX, of the city, county, and State of New York, have invented a new and improved Apparatus for Stirring Lard; and I do hereby declare that the following is a full, clear, and exact description of the same, reference being had to the accompanying drawings, forming a part of this specification, in which—

Figure 1 represents a longitudinal vertical section of this invention.

Figure 2 is a transverse vertical section of the same.

Figure 3 is a plan or top view of the same.

Similar letters of reference, in the three figures, indicate corresponding parts.

The object of this invention is to execute the operation of stirring lard by steam or other competent power, in place of hand-power, usually employed for that purpose, by the use of said apparatus, whereby uniform, or nearly uniform, agitation is given to all parts of the lard in the tank, in the process of cooling, thereby preventing granulation of the lard, and causing the same to cool uniformly and evenly, or nearly so.

The invention consists in the employment or use of perforated or slotted dashers, which move in a tank, extending from one side of the same to the other, and which are hinged, or otherwise firmly attached, to staves, connected to reciprocating rods or bars, moving, in opposite directions, through the lard in the tank, one rod or bar carrying one, and the other, two dashers, in such a manner that, when the dashers are in operation, the single dasher, attached to the staff of one of the reciprocating rods or bars, works between and in opposition to the two dashers attached to the staves of the other rod or bar, by which means the lard in the tank is thoroughly stirred, and, when it becomes sufficiently cool, the lard may be drawn off into suitable packages.

The above is the arrangement of bars, dashers, and staves, shown in the drawings, and is the arrangement thereof generally preferred by me; but it will be obvious that the staves and dashers might be somewhat differently arranged, relatively to each other, on the bars; or, the size or shape of the tank might be varied, and their number increased or diminished, and suitably arranged on the bars, with reference to each other, so that, when proper reciprocating motion is given to the bars, the dashers will alternately sweep from fixed points in the tank to other fixed points therein, so as to include, in their conjoint alternating movements in opposite directions, the entire, or nearly the entire, length of said tank, thereby giving continuous and uniform agitation to the whole body of lard in the tank during the process of cooling. I regard such changes as merely formal, and substantially within my invention.

In case said dashers are hinged to the staves, as represented in the drawings, they may be turned up out of the way, as hereinafter described, but, in practice, it will not ordinarily be found necessary to remove the dashers from the lard before it is drawn off.

To enable others skilled in the art to make and use my invention, I will proceed to describe it with reference to the drawings.

A represents a tank, made, of wood or other suitable material, in the ordinary form or shape of tanks, such as are in common use for cooling lard. The form or shape of the tank, however, may be varied, if desired.

After the lard has been heated, in a suitable pan or vessel, in the usual way, it is let down into the cooling-tank, and it must now be stirred for a considerable time, until it becomes cool, or nearly so.

The operation of stirring lard has usually been performed with a long stick or paddle, to which motion was imparted by hand.

In stirring lard, great care must be taken to stir it uniformly throughout the whole tank, because that portion of the lard which is not sufficiently stirred granulates in cooling, and its market value is thereby depreciated. For this reason, it would not answer to impart to the paddle a rotary motion, in the ordinary way, because, in this case, the lard at or near the circumference of the tank would be moved with a much greater velocity than the lard at or near the centre, and, while the outside portion, in this case, cools off rapidly, the inner portion of the lard remains in the liquid state for a long time, and, when it begins to congeal, it is liable to granulate.

The motion given to the paddle by hand is irregular and without sufficient uniformity, and is generally performed at great expense in time and labor, while the motion imparted by my apparatus is regular and steady, producing a uniform, or nearly uniform, agitation of the lard throughout the tank.

The tank is provided with two standards, B, one at each end.

These standards are slotted, and form the guides for the rods or bars C C′, to which a reciprocating motion is imparted by cranks D D′.

These cranks connect with the rods or bars C C′ by means of a pitman, *a a′*, and they are placed at angles of one hundred and eighty degrees towards each other, so that the motion of one rod is in a direction opposite to that of the other.

The rod or bar C carries one dasher, E, which is hinged, or otherwise suitably attached, to a staff, F, said staff being secured to the rod or bar C, at or near its centre, by a key or wedge, *b*, or other suitable device.

The rod or bar C′ carries two dashers, E′, which are hinged, or otherwise suitably attached, to staves F′, said staves being secured to the rod or bar C′, at or near equal distances from its centre, by keys or wedges, *b′*, or other suitable device, at such points on said bar as will cause said dashers E′ to sweep over such parts of the tank as are untraversed by the dasher E, attached to the staff F on rod C.

When the dashers E E′, or either of them, are hinged to the staff or staves, as above described, they may be made rigid, and, when in use, must be made rigid, with the staff or staves, by means of keys, *c c′*, dropping into suitable sockets, *d d′*, above and below the hinge-joint on the staff or staves, or by some other suitable device for that purpose, and, by raising said keys, or removing the fastening, the dashers can be turned up and secured in a reverse position by means of the hooks *e e′*, when desired.

The cranks D D′, which impart motion to the rods or bars C C′, are secured to a shaft, G, to which a continuous rotary motion is imparted by steam or any other competent power, and friction-rollers *f f*, secured in the standards B, above and below the rods or bars C C′, facilitate the motion, and may be used, if desired.

When the lard from the heating-pan or vessel has been let into the cooling-tank, the dashers E E′ are set in motion, and pass through the lard in opposite directions.

The motion of the dashers is so regulated that the lard throughout the whole tank is stirred uniformly, or nearly so, the dashers E′ being made to sweep from the ends of the tank towards its centre, and the dasher E meeting the dashers E′, alternately, at or near the middle, between the centre of the tank and its ends.

After the lard has been stirred sufficiently, the dashers E E′ (if hinged to the staves) may be turned up, if desired, and secured in a reverse position by the hooks *e e′*, and the lard then drawn off in suitable packages.

In case the dashers are not secured to the staves by hinges, or, being so secured, it should not be desired to turn them up, the lard may be drawn off, as before, without removing the dashers therefrom.

By this apparatus, the operation of stirring lard throughout the tank can be performed with the greatest ease, regularity, and uniformity, and a superior article thereby produced, in less time, and with less labor, than by the ordinary mode of treating lard.

Having thus fully described my invention,

What I claim as new, and desire to secure by Letters Patent, is—

1. The employment or use, for the purpose of stirring lard, of perforated or slotted dashers E E′, attached to staves F F′, which are secured to reciprocating rods or bars C C′, moving in opposite directions, all constructed, combined, arranged, and operated substantially in the manner herein shown and described; and, also, the last above-mentioned parts, in combination with said tank, constructed, arranged, and operated substantially as above described.

2. The combination of two or more dashers, moving backward and forward in the tank, in opposite directions to each other, substantially as described, for the purpose set forth.

WILLIAM J. WILCOX.

Witnesses:

SETH M. ELDREDGE,

M. B. ANDRUS.